United States Patent
Yang et al.

(10) Patent No.: US 11,232,432 B2
(45) Date of Patent: Jan. 25, 2022

(54) METHOD FOR PROVIDING CARD RECOMMENDATION INFORMATION AND DEVICE THEREOF

(71) Applicant: SAMSUNG ELECTRONICS CO., LTD., Suwon-si (KR)

(72) Inventors: Seul-ae Yang, Seoul (KR); Min-young Kang, Gyeongsangnam-do (KR); Kwang-su Kim, Hwaseong-si (KR); Sun-young Park, Seoul (KR); Hee-lok Jung, Changwon-si (KR); Ki-bum Kim, Seoul (KR); Hyun-jin Ahn, Yongin-si (KR); Jae-seok Yoon, Pyeongtaek-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/640,534

(22) PCT Filed: Jun. 26, 2018

(86) PCT No.: PCT/KR2018/007204
§ 371 (c)(1),
(2) Date: Feb. 20, 2020

(87) PCT Pub. No.: WO2019/074188
PCT Pub. Date: Apr. 18, 2019

(65) Prior Publication Data
US 2020/0356983 A1  Nov. 12, 2020

(30) Foreign Application Priority Data
Oct. 11, 2017  (KR) .......................... 10-2017-0131645

(51) Int. Cl.
G06Q 20/34  (2012.01)
G06Q 20/22  (2012.01)
G06Q 20/32  (2012.01)

(52) U.S. Cl.
CPC ......... G06Q 20/353 (2013.01); G06Q 20/227 (2013.01); G06Q 20/3224 (2013.01); G06Q 20/352 (2013.01)

(58) Field of Classification Search
CPC ............... G06Q 20/353; G06Q 20/227; G06Q 20/3224; G06Q 20/352
(Continued)

(56) References Cited

U.S. PATENT DOCUMENTS

2010/0262537 A1  10/2010  Park
2014/0222535 A1*  8/2014  Kim ...................... G06Q 30/02
                                                 705/14.23
(Continued)

FOREIGN PATENT DOCUMENTS

KR  10-0861390  10/2008
KR  10-1144030  5/2012
(Continued)

OTHER PUBLICATIONS

International Search Report dated Oct. 22, 2018 in counterpart International Patent Application No. PCT/KR2018/007204 and English-language machine translation.
(Continued)

*Primary Examiner* — Michael G Lee
*Assistant Examiner* — David Tardif
(74) *Attorney, Agent, or Firm* — Nixon & Vanderhye, P.C.

(57) ABSTRACT

Provided is a method of providing a recommended card, the method including: receiving a radio signal from at least one access point around a device; selecting one from the at least
(Continued)

one access point, based on a strength of the received radio signal; determining a card merchant corresponding to the selected access point; determining at least one recommended card regarding the determined card merchant from at least one card registered with the device, based on the card merchant and card benefit information of the registered at least one card; and providing the at least one recommended card.

11 Claims, 11 Drawing Sheets

(58) Field of Classification Search
USPC .......................................................... 235/380
See application file for complete search history.

(56) References Cited

U.S. PATENT DOCUMENTS

| | | | |
|---|---|---|---|
| 2017/0006434 A1* | 1/2017 | Howe | H04W 4/021 |
| 2017/0024724 A1* | 1/2017 | Kwak | G06Q 20/227 |
| 2017/0364906 A1 | 12/2017 | Bae | |

FOREIGN PATENT DOCUMENTS

| | | |
|---|---|---|
| KR | 10-1212186 | 12/2012 |
| KR | 10-1441288 | 9/2014 |
| KR | 10-1478011 | 12/2014 |
| KR | 10-2015-0101003 | 9/2015 |
| KR | 10-2015-0132702 | 11/2015 |
| KR | 10-1601880 | 3/2016 |
| KR | 10-2016-0060592 | 5/2016 |
| KR | 10-2017-0017293 | 2/2017 |

OTHER PUBLICATIONS

Written Opinion dated Oct. 22, 2018 in counterpart International Patent Application No. PCT/KR2018/007204 and English-language machine translation.
"Samsung Pay Service is growing much faster than Apple Pay; Says Bloomberg", http://axeetech.com/2016/03/02/samsung-pay-service-is-growing-much-faster-than-apple-pay-says-bloomberg/ (publication date: 2016), 4 pages.
"Samsung Pay Continues Rapid Global Growth with Four Market Expansions", https://news.samsung.com/global/samsung-pay-continues-rapid-global-growth-with-four-market-expansions (Apr. 27, 2017), 5 pages.

* cited by examiner

METHOD FOR PROVIDING CARD RECOMMENDATION INFORMATION AND DEVICE THEREOF

This application is the U.S. national phase of International Application No. PCT/KR2018/007204 filed 26 Jun. 2018, which designated the U.S. and claims priority to KR Patent Application No. 10-2017-0131645 filed 11 Oct. 2017, the entire contents of each of which are hereby incorporated by reference.

TECHNICAL FIELD

The present disclosure relates to a method of providing card recommendation information and a device therefor, and more particularly, to a method of providing card recommendation information by considering at least one of a card merchant, for which a card recommended to a user is to be used, and expenditure pattern information of the user, and to a device therefor.

BACKGROUND ART

Recently, due to payment convenience of credit cards or debit cards (collectively referred to as "cards", hereinafter) and various fringe benefits provided upon payments, transactions using cards rather than using cash have quickly increased.

Because there are extremely various types of cards provided by card companies and extremely various benefits according to respective types of cards, there have been difficulties for users in selecting a card to pay with by considering all benefits of cards carried by the users upon each payment. Therefore, recently, various types of applications providing card recommendation services by considering card benefits from card merchants, to which users are to make payments, have been provided.

SUMMARY

Some embodiments provide a method of determining a card merchant, for which a recommended card is to be used, based on a current position of a device, and providing the recommended card regarding the determined card merchant, and also provide the device therefor.

In addition, some embodiments provide a method of providing a recommended card regarding a card merchant, for which the recommended card is to be used, based on expenditure pattern information of a user, and also provide a device therefor.

Further, some embodiments provide a method of determining an anticipated payment amount to be paid by a user at a card merchant, for which a recommended card is to be used, and providing the recommended card by further considering the determined anticipated payment amount, and also provide a device therefor.

Furthermore, some embodiments provide a method of providing a recommended card by considering a next-month anticipated benefit of each card registered with a device, based on a current-month usage amount achievement ratio of each card registered with the device when the recommended card is provided, and also provide the device therefor.

According to a first aspect of the present disclosure, there is provided a device including: memory in which at least one program is stored; and at least one processor configured to execute the at least one program to recommend a card to a user of the device, based on a location of the device, wherein the memory includes instructions making, when the device is operated, the at least one processor to perform: receiving a radio signal from at least one access point around the device; selecting at least one from the at least one access point, based on a strength of the received radio signal; determining a card merchant corresponding to the selected at least one access point; determining at least one recommended card regarding the determined card merchant from at least one card registered with the device, based on the card merchant and card benefit information of the registered at least one card; and providing the at least one recommended card.

According to a second aspect of the present disclosure, there is provided a method of providing a recommended card, the method including: receiving a radio signal from at least one access point around a device; selecting at least one from the at least one access point, based on a strength of the received radio signal; determining a card merchant corresponding to the selected at least one access point; determining at least one recommended card regarding the determined card merchant from at least one card registered with the device, based on the card merchant and card benefit information of the registered at least one card; and providing the at least one recommended card.

According to a third aspect of the present disclosure, there is provided a computer program product including a computer-readable storage medium, the computer-readable storage medium including instructions for performing: receiving a radio signal from at least one access point around a device; selecting at least one from the at least one access point, based on a strength of the received radio signal; determining a card merchant corresponding to the selected at least one access point; determining at least one recommended card regarding the determined card merchant from at least one card registered with the device, based on the card merchant and card benefit information of the registered at least one card; and providing the at least one recommended card.

In the present disclosure, determining of an anticipated payment amount may include: extracting a voice signal indicating a payment amount from a voice signal received through a microphone of the device; and determining the anticipated payment amount based on the extracted voice signal.

In the present disclosure, the determining of the anticipated payment amount may include receiving an input of the anticipated payment amount.

In the present disclosure, the determining of the at least one recommended card may include: generating expenditure pattern information of the user, based on card approval details stored in the device; and determining the at least one recommended card from the registered at least one card, based on the expenditure pattern information of the user, and the expenditure pattern information of the user may include metadata for at least one of card usage amount information of each of the registered at least one card, a card usage date, a card usage time, ranking information of a card merchant business category preferred by the user, and a card usage frequency of the user for each card merchant business category.

DETAILED DESCRIPTION

Figure 1:
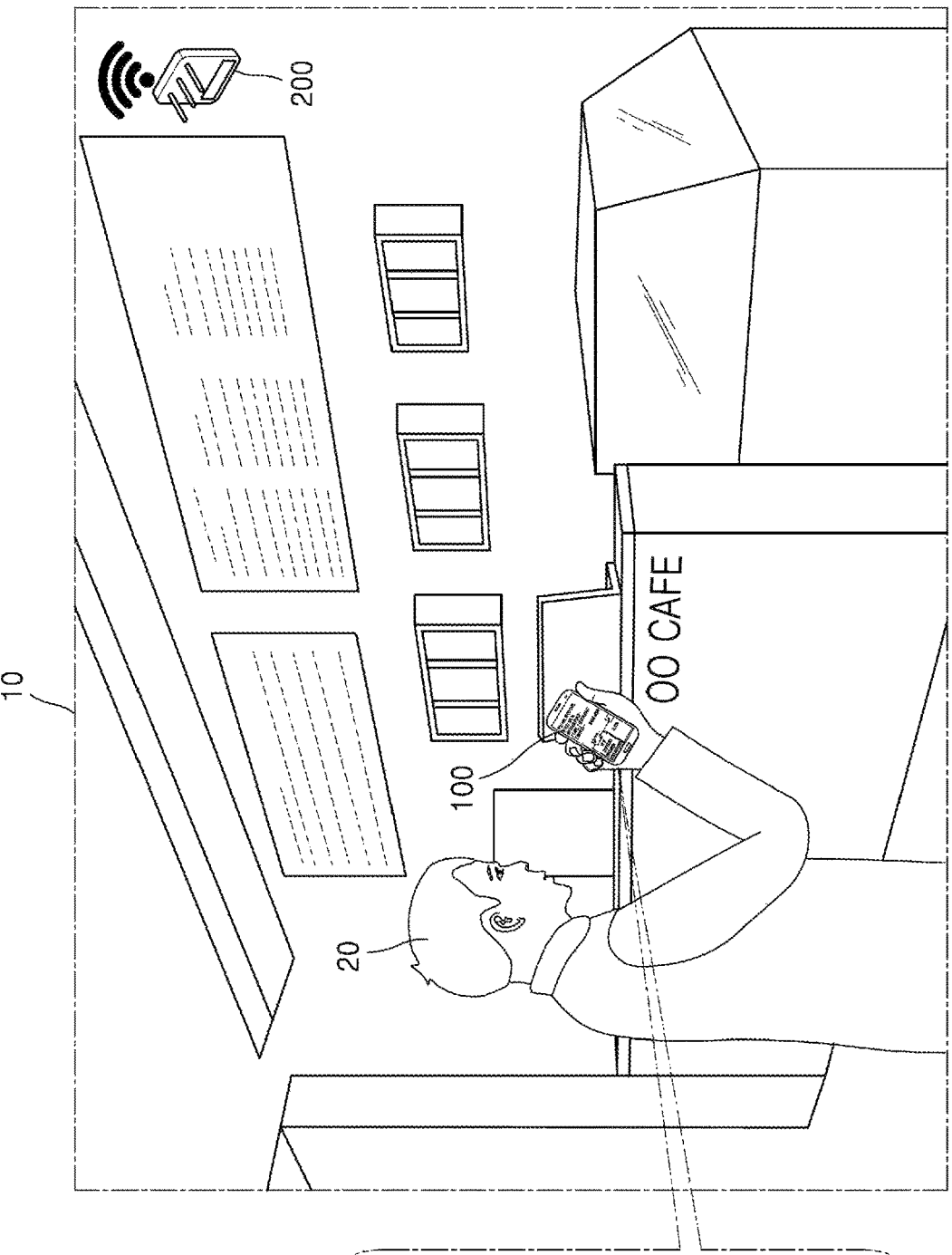
FIG. 1 is a diagram illustrating an example in which a device 100 recommends a card to a user 20, according to an embodiment.

Hereinafter, embodiments of the present disclosure will be described in detail with reference to the accompanying drawings such that one of ordinary skill in the art may readily make implementations thereof. However, it should be understood that the present disclosure may be embodied in different ways and is not limited to embodiments described herein. In addition, portions irrelevant to the description will be omitted from the drawings for clarity, and like components will be denoted by like reference numerals throughout the specification.

Throughout the specification, when an element is referred to as being "connected to" another element, the element may be "directly connected to" the other element, or the element may also be "electrically connected to" the other element with an intervening element therebetween. In addition, when an element is referred to as "including" or "comprising" another element, unless otherwise stated, the element may further include or comprise another element rather than preclude the yet other element.

As used herein, in particular, in the accompanying claims, the directive terms such as "the," "said" and "aforementioned" may indicate both the singular forms and the plural forms. In addition, unless the context clearly indicates the order of operations of a method according to the present disclosure, the operations may be performed in a suitable order. The present disclosure is not limited to the described order of the operations.

Hereinafter, embodiments of the present disclosure will be described in detail with reference to the accompanying drawings.

FIG. 1 is a diagram illustrating an example in which a device 100 recommends a card to a user, according to an embodiment.

Referring to FIG. 1, the device 100 according to an embodiment may provide a recommended card, based on a current location of the device 100. The device 100 may provide the recommended card determined based on the current location of the device 100, for a card payment at a card merchant 10.

For example, although the current location of the device 100 may be determined by an indoor positioning method by using an access point 200 around the device 100, the present disclosure is not limited thereto.

According to an embodiment, when a user 20 pays with the recommended card at the card merchant 10, the device 100 may provide, as the recommended card, a card providing a benefit of the greatest discount amount by considering expenditure pattern information of the user 20 as well as card benefit information of each of at least one card registered with the device 100.

Here, the card benefit information may include a type of benefit provided when a payment is made using a card registered with the device 100, conditions for a benefit to be provided, a limit in providing a benefit, and the like. The device 100 may obtain the card benefit information of each of the at least one card registered with the device 100 from a card company home page, although the present disclosure is not limited thereto.

In addition, as used herein, the term "expenditure pattern information of the user 20" may refer to information including metadata for at least one of card usage amount information of each of the at least one card registered with the device 100, a card usage date, a card usage time, a card merchant business category preferred by the user 20, and a card usage frequency of the user 20 for each card merchant business category. The device 100 may generate the expenditure pattern information of the user 20 based on card approval details stored in the device 100, although the present disclosure is not limited thereto.

In addition, as used herein, the term "card providing the greatest benefit" may refer to a card providing the greatest benefit in terms of money to the user 20 when the user 20 pays with a card.

Further, the device 100 may include, but is not limited to, a smart phone, a tablet personal computer (PC), a PC, a smart television (TV), a mobile phone, a personal digital assistant (PDA), a laptop, a media player, a microserver, a global positioning system (GPS) device, an electronic book terminal, a digital broadcasting terminal, a navigation system, a kiosk, an MP3 player, a digital camera, a household appliance, or other mobile or non-mobile computing devices. Furthermore, the device 100 may include a wearable device, such as a watch, glasses, a hair band, or a ring, which has functions of communication and data processing. However, the present disclosure is not limited thereto, and the device 100 may include any type of device capable of providing the recommended card based on the location of the device 100.

Figure 2:
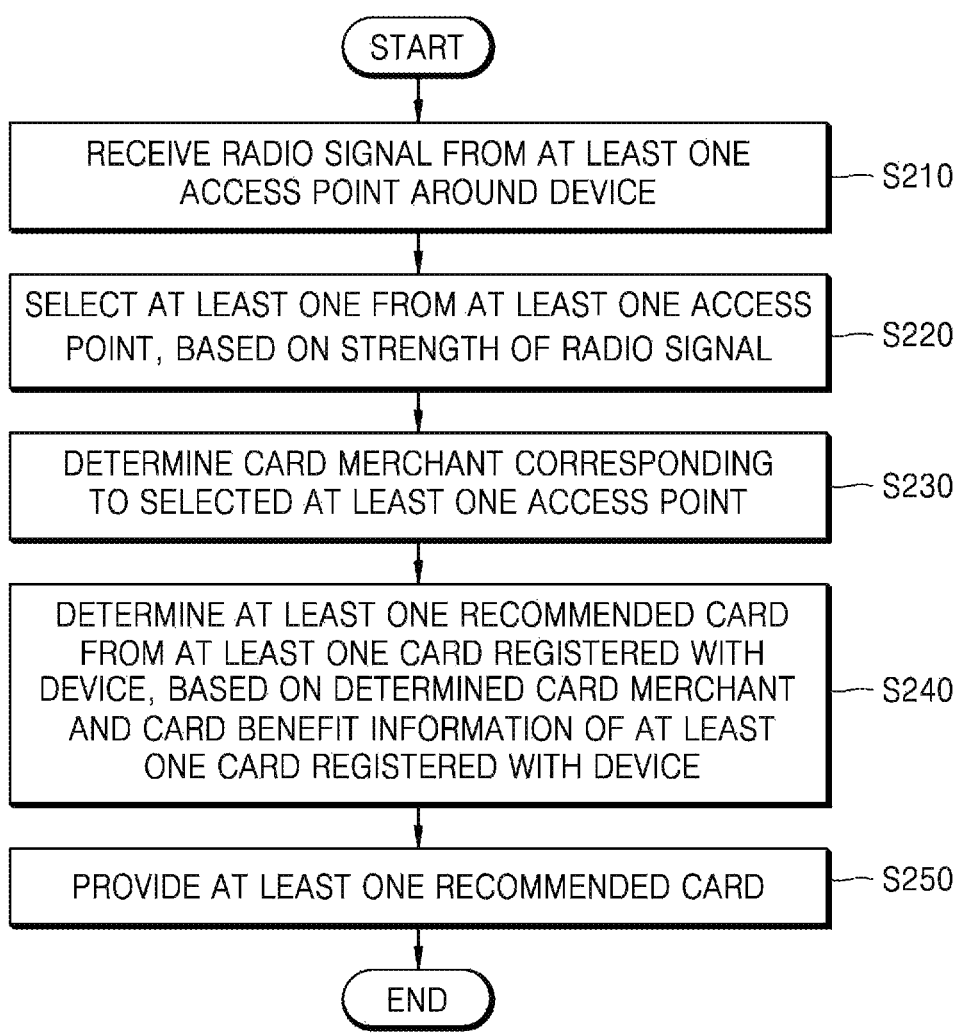
FIG. 2 is a flowchart of a method, performed by the device 100, of providing a recommended card, according to an embodiment.

FIG. 2 is a flowchart of a method, performed by the device 100, of providing a recommended card, according to an embodiment.

Referring to FIG. 2, a method, performed by the device 100, of determining the card merchant 10, for which a card recommended to the user 20 is to be used, based on the current location of the device 100 is illustrated.

In operation S210, the device 100 receives a radio signal from at least one access point around the device 100.

Each card merchant may have at least one access point unique to each card merchant. Access points of the respective card merchants may transmit radio signals to the device 100 around the access points. The device 100 may receive a radio signal transmitted by the at least one access point around the device 100 according to the location of the device 100.

In operation S220, the device 100 determines at least one access point 200 from the at least one access point, based on the strength of the received radio signal.

For example, the device 100 may determine the at least one access point 200 transmitting a radio signal having a certain strength or higher to the device 100. In another example, the device 100 may determine the at least one access point 200 transmitting a radio signal having the highest strength to the device 100, from the at least one access point around the device 100.

In operation S230, the device 100 determines a card merchant corresponding to the selected at least one access point 200.

The device 100 may determine a card merchant having the determined at least one access point 200. The device 100 may determine the card merchant corresponding to the determined at least one access point 200, as the card merchant 10 for which the card recommended to the user 20 is to be used.

The device 100 may determine the card merchant matching the determined at least one access point 200, as the card merchant 10 for which the recommended card is to be used.

To determine the card merchant having the at least one access point 200, the device 100 may obtain an identification value of the at least one access point 200. For example, the device 100 may receive an identification value broadcasted by the at least one access point 200. The identification value broadcasted by the at least one access point 200 may include, but is not limited to, a service set identification (SSID) or a basic service set ID (BSSID).

In addition, the device 100 may determine a card merchant matching the obtained identification value, as the card merchant 10 for which the recommended card is to be used. For example, the card merchant matching the obtained identification value may be determined based on access point information of the radio signal received by the device 100 upon card approval and card merchant information within the card approval details. More detailed descriptions of a method, performed by the device 100, of determining the card merchant 10, for which the recommended card is to be used, will be made below with reference to FIG. 3.

In operation S240, the device 100 determines at least one recommended card from the at least one card registered with the device 100, based on the determined card merchant and the card benefit information of the at least one card registered with the device 100.

The device 100 may receive an input for registering a card carried by the user 20 with the device 100. For example, the device 100 may receive an input of at least one of a type, an expiration date, and a card number of the card carried by the user 20. The device 100 may register the card carried by the user 20 with the device 100 by storing the received input in the device 100.

The device 100 may obtain the card benefit information of the at least one card registered with the device 100. The device 100 may obtain the card benefit information of the at least one card registered with the device 100, by using information provided by a web site of each card company. For example, the device 100 may obtain, through web crawling, the card benefit information of the at least one card registered with the device 100 from the information provided by the web site of each card company.

In another embodiment, the device 100 may obtain the card benefit information of the at least one card registered with the device 100 from an external server or a database.

The device 100 may determine, as the recommended card, at least one card providing a card benefit related to the card merchant 10, for which the recommended card is to be used, by analyzing the card benefit information of the at least one card registered with the device 100.

In one embodiment, the device 100 may determine at least one evaluation item for determining the recommended card. For example, the evaluation item may include, but is not limited to, a discount benefit amount provided by each card regarding the card merchant 10, whether a previous-month usage amount of each card achieves a reference, whether benefit usage exceeds a limit, a current-month usage amount achievement ratio, an anticipated payment amount to be paid with the recommended card by the user 20 at the card merchant 10, or the like.

The device 100 may calculate an evaluation value for each of at least one card providing a benefit related to the card merchant 10, by applying a different weight to each of the at least one evaluation item. Here, the weight applied to each evaluation item may be differently determined for each user 20 according to profile information of each user 20, such as a gender, an age, a marital status, the number of family members, an average monthly income, or automobile ownership or not. The device 100 may calculate the evaluation value for determining the recommended card from the at least one card providing the benefit related to the card merchant 10 where the user (20) is located, based on the at least one evaluation item. The device 100 may determine, as the recommended card, at least one card obtaining an evaluation value equal to or greater than a certain value, from the at least one card providing the benefit related to the card merchant 10. Alternatively, the device 100 may determine, as the recommended card, at least one card obtaining the highest evaluation value, from the at least one card providing the benefit related to the card merchant 10.

In addition to the embodiments described above, various methods known in the art may be used as a method, performed by the device 100, of analyzing the card benefit information of the at least one card registered with the device 100, and detailed descriptions thereof will be omitted.

In addition, the device 100 according to an embodiment may determine, as the recommended card, at least one from the at least one card registered with the device 100 by further considering the expenditure pattern information of the user 20.

The device 100 may generate the expenditure pattern information of the user, based on the card approval details stored in the device 100. The expenditure pattern information may be information generated based on expenditure activities of the user 20 and reflecting the expenditure habit, preference, expenditure pattern, or the like of the user 20. For example, the expenditure pattern information may include, but is not limited to, information about at least one of the card usage amount information of each of the at least one card registered with the device 100, the card usage date, the card usage time, the ranking information of the card merchant business category preferred by the user 20, and the card usage frequency of the user 20 for each card merchant business category.

For example, the device 100 may generate the expenditure pattern information of the user 20 based on card approval details of a text message (that is, short message service (SMS)) received from a card company. The device 100 may extract data such as identification information of a card used for a payment, a card approval date, a card approval time, a payment amount, and a card merchant name, which are included in the card approval details. The device 100 may generate the expenditure pattern information representing the expenditure pattern of the user 20, by using the data extracted from the card approval details. By using the data extracted from the card approval details, the device 100 may generate the expenditure pattern information of the user 20, which includes metadata for at least one of the card usage amount information of each of the at least one card registered with the device 100, the card usage date, the card usage time, the card merchant business category preferred by the user 20, and the card usage frequency of the user 20 for each card merchant business category.

In another example, the device 100 may generate the expenditure pattern information of the user 20 based on data of an application providing a household account book function, the data being stored in the device 100.

In another example, the device 100 may receive the card approval details of the user 20 from an external server, a database, or an external device. The device 100 may generate the expenditure pattern information of the user 20 based on the card approval details of the user 20, the card approval details being received from the external server, the database, or the external device.

In addition, the device 100 according to an embodiment may determine, as the recommended card, at least one from the at least one card registered with the device 100 by further considering an anticipated payment amount, which is anticipated to be paid by the user 20 at the card merchant 10. The device 100 may determine, by itself, the anticipated payment amount, which is anticipated to be paid by the user 20 at the card merchant 10, or may obtain the anticipated payment amount from an external device. More detailed descriptions of a method, performed by the device 100, of obtaining the anticipated payment amount, will be made below with reference to FIGS. 6 to 8.

In operation S250, the device 100 may provide the determined at least one recommended card.

Figure 11:
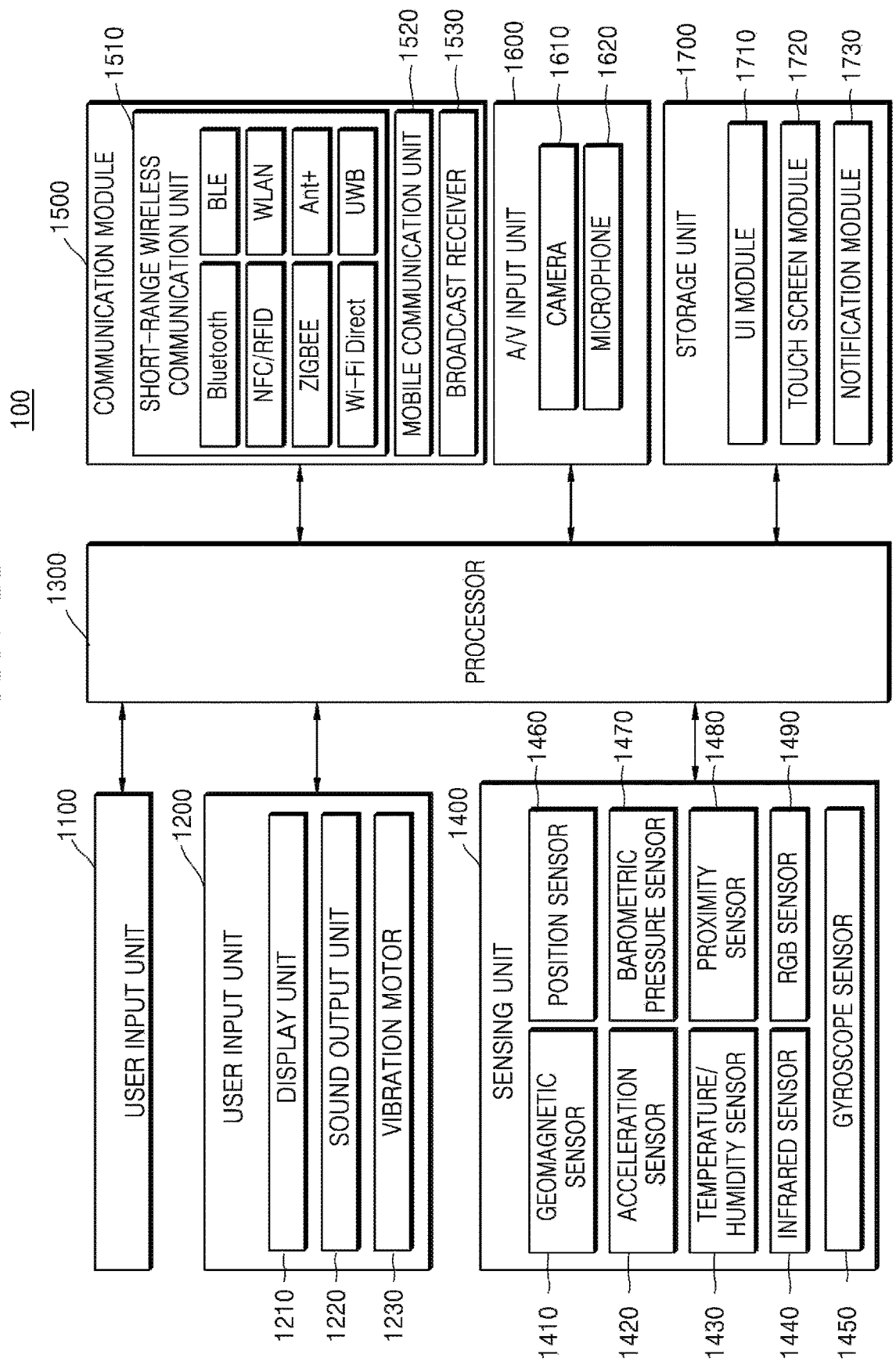
FIG. 11 is a block diagram of the device 100 according to an embodiment.

In one embodiment, the device 100 may output the determined at least one recommended card through an output unit (1200 of FIG. 11). For example, the device 100 may display the determined at least one recommended card through a display unit 1210. In addition, the device 100 may output information about the determined at least one recommended card by way of at least one of a sound and a vibration, by using at least one of a sound output unit 1220 and a vibration motor 1230.

In one embodiment, the device 100 may transmit the information about the determined at least one recommended card to an external device. For example, the external device may include, but is not limited to, a point-of-sale (POS) system of the card merchant 10, for which the recommended card is to be used.

Figure 3:
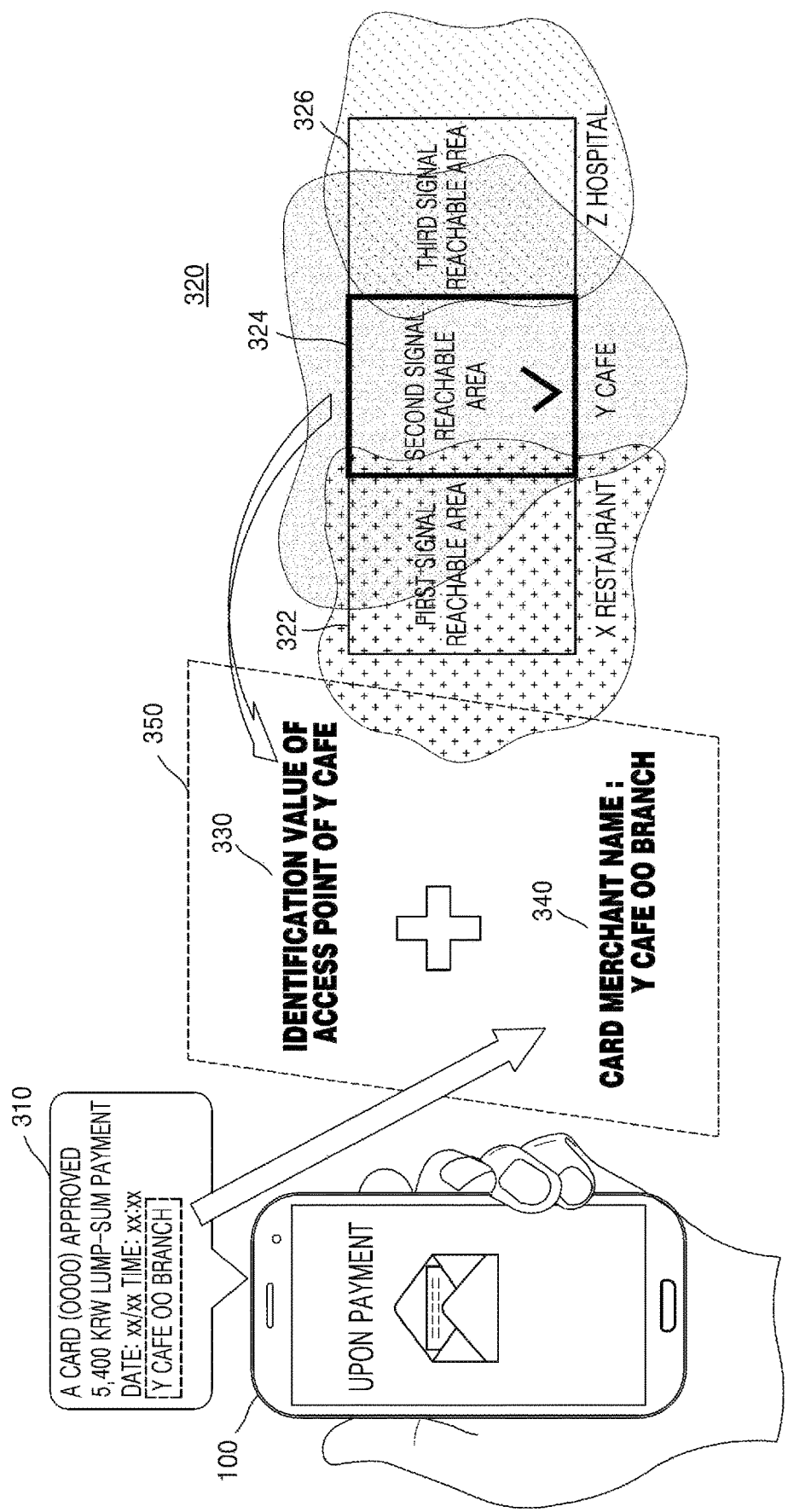
FIG. 3 is a diagram illustrating an example in which the device 100 determines a card merchant 10, for which a card recommended to the user 20 is to be used, based on a location of the device 100, according to an embodiment.

FIG. 3 is a diagram illustrating an example where the device 100 generates matching information for determining the card merchant 10, for which the card recommended to the user 20 is to be used, based on the location of the device 100, according to an embodiment.

Referring to operation S210 of FIG. 2, the device 100 may determine the card merchant 10, for which the card recommended to the user 20 is to be used, based on the current location of the device 100. In addition, the device 100 may use an indoor positioning method, by which the current location of the device 100 is determined based on radio signals received from access points around the device 100.

Referring to FIG. 3, examples of reachable areas 320 of radio signals transmitted from access points of card merchants around the device 100 are illustrated. For example, there may be an X restaurant, a Y cafe, and a Z hospital around the device 100. An access point of the X restaurant may transmit a radio signal to a first radio signal reachable area 322, an access point of the Y cafe may transmit a radio signal to a second radio signal reachable area 324, and an access point of the Z hospital may transmit a radio signal to a third radio signal reachable area. The first to third radio signal reachable areas 322, 324, and 326 may respectively include regions overlapping each other. However, this is merely an example, and the reachable areas of the radio signals transmitted by the access points of the respective card merchants may not overlap each other.

The device 100 may receive radio signals from the access points around the device 100. For example, when the user 20 using the device 100 has got into the Y cafe while carrying the device 100, the device 100 may receive a radio signal provided by the X restaurant or the Z hospital around the Y cafe as well as a radio signal provided by the Y cafe, according to the location of the device 100. The reason is that, even when the device 100 is in the second radio signal reachable area 324, the second radio signal reachable area 324 partially overlaps each of the first radio signal reachable area 322 and the third radio signal reachable area 326.

The device 100 may select one from the access points around the device 100, based on the strength of at least one radio signal that is received. The device 100 may determine an access point transmitting a radio signal having the highest strength, from the access points around the device 100. For example, when the device 100 is in the second radio signal reachable area 324, a radio signal received from the access point of the Y cafe, of the at least one radio signal received by the device 100, may have the highest strength. Accordingly, the device 100 may determine the access point of the Y cafe from the at least one access point around the device 100.

The device 100 may obtain an identification value of the selected access point. The access point has a unique identification value such as an SSID or a BSSID, and the device 100 may identify the access point based on the identification value of the access point. For example, the device 100 may obtain an identification value of the access point of the Y cafe.

The device 100 may determine a card merchant matching the obtained identification value, as the card merchant 10 for which the recommended card is to be used. To determine the card merchant 10 for which the recommended card is to be used, the device 100 may use matching information in which an identification value of an access point of each card merchant matches each card merchant name.

Referring to FIG. 3, an example of a method, performed by the device 100, of generating matching information 350 by matching the identification value of the access point of each card merchant with each card merchant name, is illustrated.

When the user 20 pays with a card, the device 100 may generate the matching information, based on the identification value of the access point that is determined based on the card approval details received by the device 100 and the strength of the received radio signal.

For example, when the user 20 pays with a card in the Y cafe, the device 100 may extract information indicating a card merchant name 340, for which a card payment is made, from received card approval details 310. In addition, when the user 20 pays with a card in the Y cafe, the device 100 may obtain an identification value 330 of the access point determined based on the strength of the received radio signal, according to the method described above. The device 100 may generate the matching information 350 by matching the extracted information indicating the card merchant name with the obtained identification value of the access point.

The card merchant name in the card approval details 310 may sometimes have some missing letters. For example, the card approval details 310 may be received as a text message by the device 100, and a portion of the card merchant name may be cut out upon the reception thereof due to a capacity limit of the text message or the like.

Accordingly, to obtain the more accurate card merchant name 340, the device 100 according to an embodiment may further use, as the matching information 350, a GPS signal received through a GPS of the device 100 when a card payment is made by the user 20. The device 100 may receive the GPS signal through the GPS of the device 100 during the card payment. The device 100 may determine a point corresponding to the received GPS signal on a map. The device 100 may obtain, from the map, the card merchant name located at the determined point. The device 100 may correct information corresponding to the card merchant name, which is extracted from the card approval details 310, by using the card merchant name determined based on the GPS signal.

Whenever the user 20 pays with a card, the device 100 may generate the matching information in which the card merchant name having received the payment matches the identification value of the access point. Accordingly, the matching information may be updated whenever the user 20 using the device 100 makes card payments in several card merchants while carrying the device 100. In addition, the device 100 may transmit the generated matching information to an external server.

In the disclosed embodiments, although it has been described that the device 100 generates the matching information in which the identification value of the access point matches the card merchant name, the present disclosure is not limited thereto. The device 100 may receive the matching information generated by an external device and, based on the received matching information, may determine the card merchant matching the identification value of the access point.

In addition, the device 100 may receive the matching information from a server storing the matching information and, based on the received matching information, may determine the card merchant matching the identification value of the access point.

Figure 4:
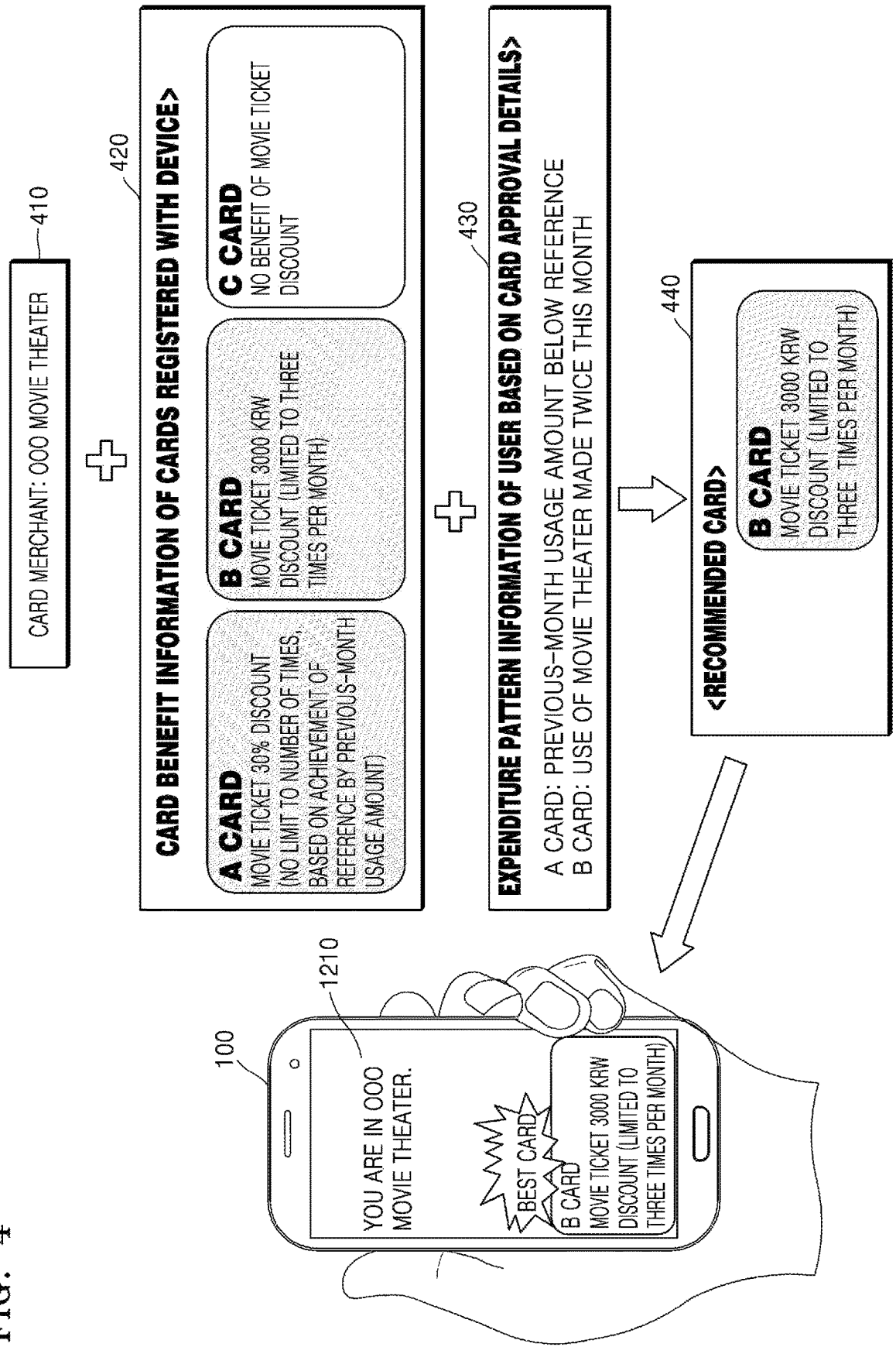
FIG. 4 is a diagram illustrating a method, performed by the device 100, of providing a recommended card, according to an embodiment.

FIG. 4 is a diagram illustrating a method, performed by the device 100, of providing a recommended card, according to an embodiment.

Referring to FIG. 4, the device 100 according to an embodiment may determine a recommended card 440, based on a determined card merchant 410, card benefit information 420 of each card registered with the device 100, and expenditure pattern information 430 of the user 20, which is based on the card approval details.

For example, the device 100 may determine a current location of the user 20, based on the location of the device 100. The device 100 may determine the card merchant 410, for which the recommended card 440 is to be used by the user 20, as a '000 movie theater', based on the location of the device 100.

In addition, an A card, a B card, and a C card among cards carried by the user 20 may have been registered with the device 100. The device 100 may determine at least one card providing a card benefit related to the card merchant 410, for which the recommended card 440 is to be used, based on the card benefit information 420 of each of the A card, the B card, and the C card, which are registered. For example, when a previous-month usage amount of the A card has achieved a reference, the A card may have a card benefit providing a discount of 30% off the price upon a payment for a movie ticket without a limit to the number of times. In addition, the B card may have a card benefit providing a discount of 3,000 Korean Won (KRW) off the price upon a payment for a movie ticket with a limit to three times per month, regardless of a previous-month usage amount. Further, the C card may have no card benefit related to a movie ticket. The device 100 may determine the A card and the B card, each providing a benefit related to the card merchant 410, based on the card benefit information 420.

In addition, the device 100 may determine the recommended card 440 from at least one card providing a card benefit related to the card merchant 410, based on the expenditure pattern information 430 of the user 20. For example, the expenditure pattern information 430 may include information indicating that the previous-month usage amount of the A card by the user 20 is below the reference. In addition, the expenditure pattern information 430 may include information indicating that the user 20 has used the B card twice in a movie theater and thus has received the card benefit of the B card regarding a movie ticket twice. The device 100 may determine, based on the expenditure pattern information 430, that the user 20 is not currently allowed to receive a card benefit despite paying with the A card because the previous-month usage amount of the A card has not achieved the reference, and that the user 20 is allowed to receive a card benefit when paying with the B card because the user 20 has received only two out of a total of three benefits of the B card regarding a movie ticket. The device 100 may determine, based on the expenditure pattern information 430, as the recommended card 440, the B card allowing the user 20 to actually receive a benefit related to the card merchant 410, from between the A card and the B card, each providing a benefit related to the card merchant 410.

The device 100 may provide the determined recommended card 440 to the user 20. The device 100 may display the determined recommended card 440 to the user 20 through the display unit 1210.

Figure 5:
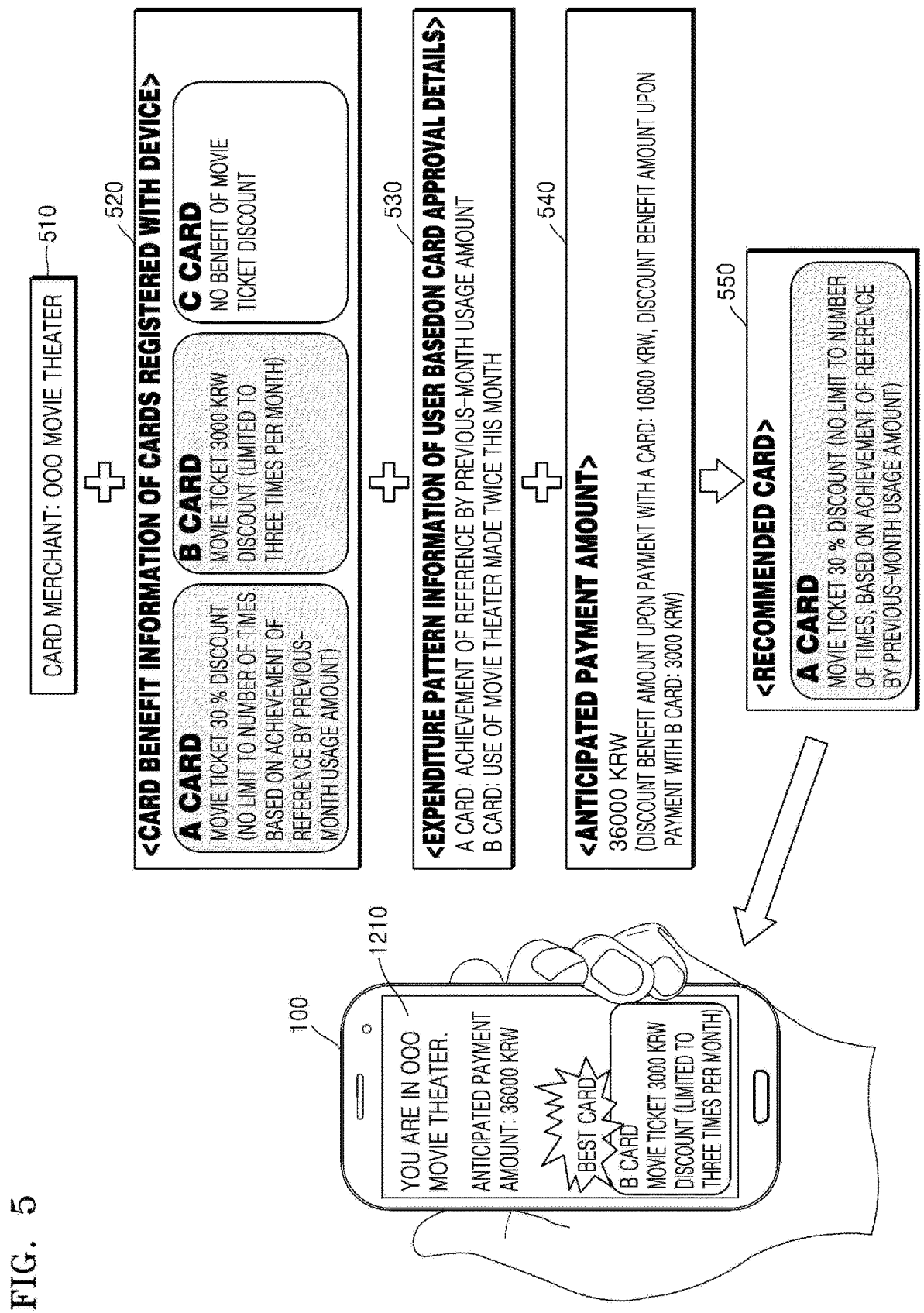
FIG. 5 is a diagram illustrating a method, performed by the device 100, of providing a recommended card, according to another embodiment.

FIG. 5 is a diagram illustrating a method, performed by the device 100, of providing a recommended card, according to another embodiment.

Referring to FIG. 5, as compared with FIG. 4 described above, a method, performed by the device 100, of determining a recommended card 550 by further using an anticipated payment amount 540 is illustrated.

According to an embodiment, the device 100 may determine the recommended card 550 by further using the anticipated payment amount 540, in addition to using a determined card merchant 510, card benefit information 520 of each card registered with the device 100, and expenditure pattern information 530 of the user 20, which is based on the card approval details.

For example, the device 100 may determine, as a '000 movie theater', the card merchant 510, for which the recommended card 550 is to be used by the user 20, based on the location of the device 100.

In addition, the A card, the B card, and the C card among the cards carried by the user 20 may have been registered with the device 100. The device 100 may determine at least one card providing a card benefit related to the card merchant 510, for which the recommended card 550 is to be used, based on the card benefit information 520 of each of the A card, the B card, and the C card, which are registered. For example, when the previous-month usage amount of the A card has achieved the reference, the A card may have a card benefit providing a discount of 30% off the price upon a payment for a movie ticket without a limit to the number of times. In addition, the B card may have a card benefit providing a discount of 3,000 KRW off the price upon a payment for a movie ticket with a limit to three times per month, regardless of a previous-month usage amount. Further, the C card may have no card benefit related to a movie ticket. The device 100 may determine the A card and the B card, each providing a benefit related to the card merchant 510, based on the card benefit information 520.

In addition, the device 100 may determine at least one card, which may currently provide a card benefit upon a card payment, from the at least one card providing a card benefit related to the card merchant 510, based on the expenditure pattern information 530 of the user 20. For example, the expenditure pattern information 530 may include information indicating that the previous-month usage amount of the A card by the user 20 has achieved the reference. In addition, the expenditure pattern information 530 may include information indicating that the user 20 has used the B card twice in a movie theater and thus has received two card benefits of the B card regarding a movie ticket. The device 100 may determine, based on the expenditure pattern information 530, that the user 20 is currently allowed to receive a card benefit of a discount of 30% off the price when paying with the A card because the previous-month card usage amount of the A card has achieved the reference, and that the user 20 is allowed to receive a card benefit of a discount of 3,000 KRW off the price even when paying with the B card because the user 20 has received only two out of a total of three benefits of the B card regarding a movie ticket. The device 100 may determine both the A card and the B card as a card currently allowed to provide a card benefit upon a card payment, from between the A card and the B card, each providing a card benefit related to the card merchant 510.

The device 100 may determine the anticipated payment amount 540, which is anticipated to be paid by the user 20 at the card merchant 510. More detailed descriptions regarding a method, performed by the device 100, of determining the anticipated payment amount 540 will be made below with reference to FIGS. 6 to 8.

The device 100 may determine, as the recommended card 550, a card allowed to provide a benefit of a greater discount from between the A card and the B card determined to be allowed to currently provide a card benefit related to the card merchant 510 upon a card payment, based on the determined anticipated payment amount 540.

For example, as shown in FIG. 5, there may be a card (for example, the A card) providing a benefit of a discount as much as some percentage of an original amount to be paid, and a card (for example, the B card) providing a benefit of a discount as much as a fixed amount regardless of the original amount to be paid. In this case, the A card, unlike the B card, may provide a different discount benefit amount according to the original amount to be paid. The device 100 may calculate, based on the anticipated payment amount 540, a discount benefit amount which may be provided when making a payment with each of the A card and the B card both determined to be allowed to provide a card benefit related to the card merchant 510.

For example, when the anticipated payment amount 540 is 36,000 KRW, the device 100 may calculate that the discount benefit amount provided when making a payment with the A card is 10,800 KRW (36,000*0.3=10,800) and the discount benefit amount provided when making a payment with the B card is 3,000 KRW.

The device 100 may determine the recommended card 550 from between the A card and the B card, which are determined to be allowed to currently provide a card benefit related to the card merchant 510 upon making a payment, based on the calculated discount benefit amounts. The device 100 may determine, as the recommended card 550, the A card providing a greater discount benefit amount. However, the present disclosure is not limited thereto, and the device 100 may determine the recommended card 550 by further using other determination criteria in addition to the discount benefit amount.

The card providing a greater discount benefit amount may vary according to a payment amount at the card merchant 10 for which the recommended card is to be used. According to the disclosed embodiments, the device 100 may determine the recommended card by further using the anticipated payment amount of the user 20 at the card merchant, for which the recommended card is to be used, in addition to using the card benefit information and the expenditure pattern information of the user 20, thereby more accurately determining the recommended card providing a benefit of a more discount amount to the user 20.

Figure 6:
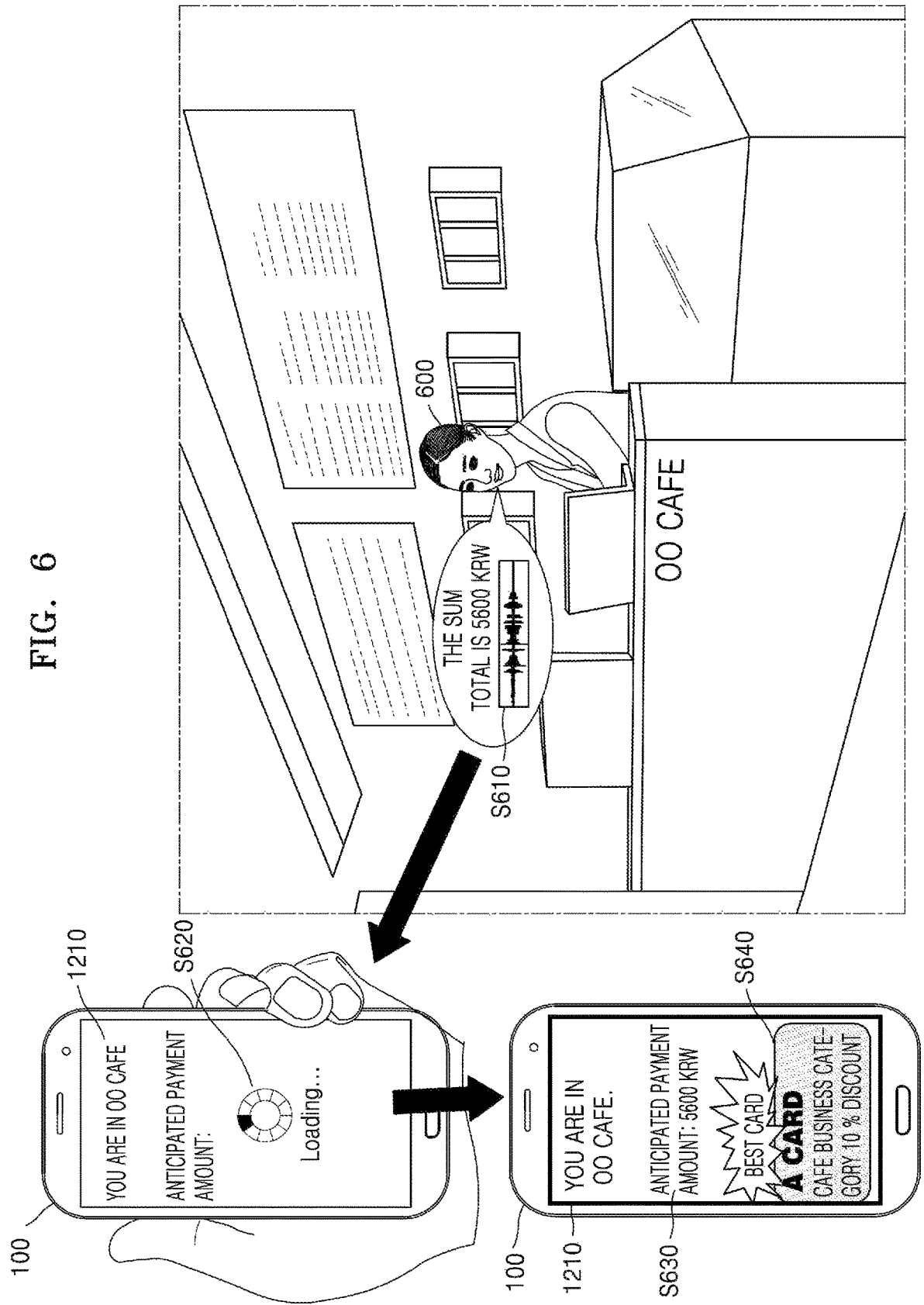
FIG. 6 is a diagram illustrating an example in which the device 100 determines an anticipated payment amount based on a received voice signal, according to an embodiment.

FIG. 6 is a diagram illustrating an example in which the device 100 determines an anticipated payment amount based on a received voice signal, according to an embodiment.

Referring to FIG. 6, the device 100 may receive a voice signal of a cashier 600 of the card merchant 10, for which a recommended card is to be used, through a microphone (1620 of FIG. 11) (S610).

For example, the cashier 600 may inform the user 20 about a total payment amount, based on order details of the user 20. The device 100 may receive a voice signal generated when the cashier 600 says to the user 20 "You ordered 00 and XX, and the total sum is 5,600 KRW."

The device 100 may extract a voice signal indicating a payment amount from the received voice signal. In the example described above, the device 100 may extract '5,600 KRW' as the voice signal indicating the payment amount, from the received voice signal.

The device 100 may determine the anticipated payment amount to be paid with the recommended card by the user 20 at the card merchant, based on the extracted voice signal indicating the payment amount (S620). In the example described above, the device 100 may determine the anticipated payment amount as 5,600 KRW, based on the extracted voice signal, that is, '5,600 KRW'.

The device 100 may provide, to the user 20, the determined anticipated payment amount and a discount benefit amount calculated based on the anticipated payment amount. The device 100 may display the determined anticipated payment amount and the discount benefit amount calculated based on the anticipated payment amount, through the display unit 1210.

The device 100 may determine the recommended card, based on the determined anticipated payment amount, the card benefit information of each card registered with the device 100, and the expenditure pattern information of the user 20 (S630).

The device 100 may provide the determined recommended card to the user 20 (S640). The device 100 may display the determined recommended card through the display unit 1210.

Figure 7:
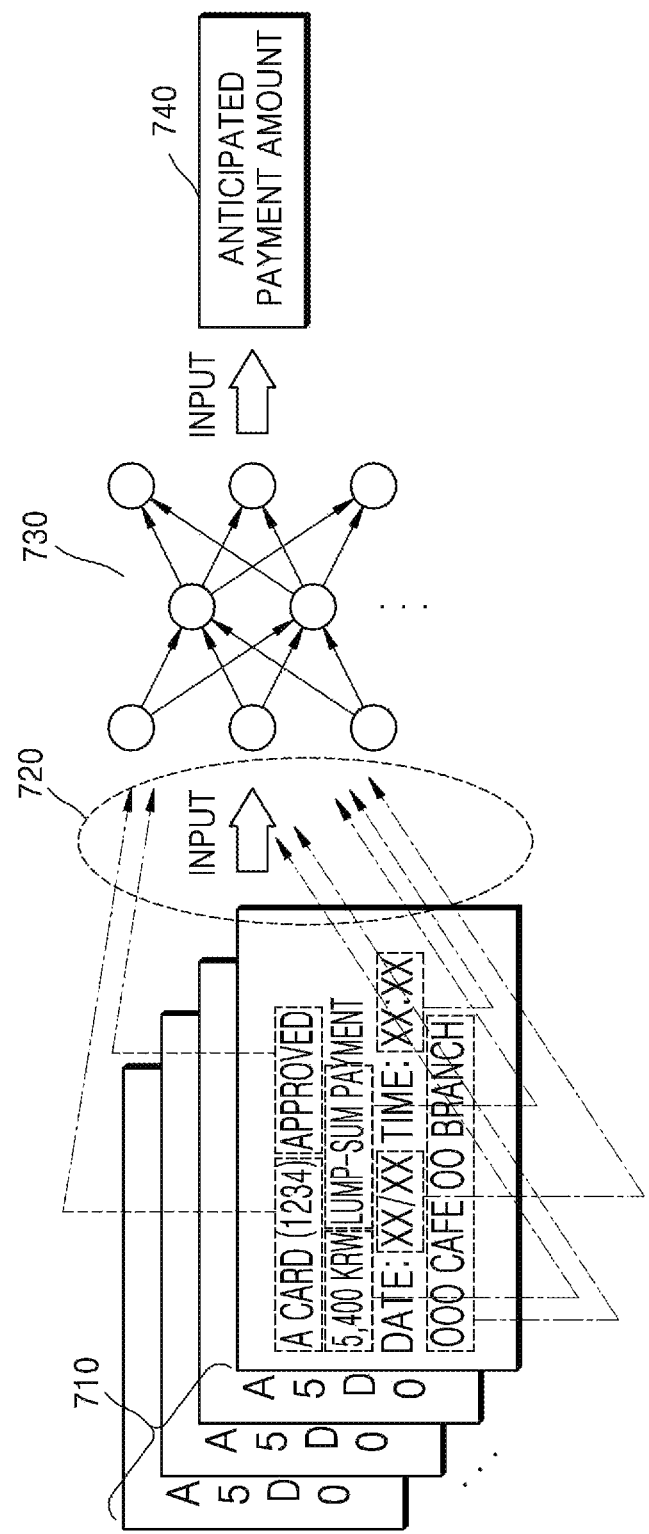
FIG. 7 is a diagram illustrating an example in which the device 100 determines an anticipated payment amount based on card approval details of the user 20, according to an embodiment.

FIG. 7 is a diagram illustrating an example in which the device 100 determines an anticipated payment amount based on card approval details of a user, according to an embodiment.

Referring to FIG. 7, the device 100 may calculate an anticipated payment amount 740 based on card approval details 710.

For example, the card approval details 710 may be a text message (that is, SMS) received from a card company when the user 20 pays with a card. The card approval details 710 may include data indicating identification information of a card used for a card payment, a payment amount, a payment method (either a lump-sum payment or an installment payment), a payment date, a payment time, a card merchant name, and the like. The device 100 may extract data of each element included in the card approval details 710. Here, the extracted data may be used as input data 720 for the device 100 to estimate the anticipated payment amount 740, based on a learning model 730 built by machine learning.

The device 100 may estimate the anticipated payment amount 740 based on the learning model 730 built by machine learning, by using, as the input data 720, the data extracted from the card approval details 710. The device 100 may estimate the anticipated payment amount 740 by further using at least one of the card merchant 10, for which the recommended card is to be used, and a business category of the card merchant 10, for which the recommended card is to be used, in addition to using the data extracted from the card approval details 710.

In one embodiment, the device 100 may generate the expenditure pattern information of the user 20 by using the data extracted from the card approval details 710. The device 100 may generate the expenditure pattern information of the user 20 by using the data extracted from the card approval details 710, the expenditure pattern information including metadata for at least one of the card usage amount information of each of the at least one card registered with the device 100, the card usage date, the card usage time, the ranking information of the card merchant business category preferred by the user 20, and the card usage frequency of the user 20 for each card merchant business category.

The device 100 may determine the anticipated payment amount based on the expenditure pattern information of the user 20. The anticipated payment amount may refer to an amount anticipated to be paid with the recommended card by the user 20 at the card merchant 10, for which the recommended card is to be used.

For example, based on the expenditure pattern information of the user 20, the device 100 may calculate an average payment amount paid by the user 20 at at least one card merchant having the same business category as that of the card merchant 10, for which the recommended card is to be used. Even for card merchants having the same business category, the expenditure pattern of the user 20 may vary according to each season, each time zone, or each day of the week. Accordingly, the device 100 may calculate the average payment amount based on the expenditure pattern information of the user 20, by further considering one of a current date and a current time, at which the recommended card is provided, or a combination thereof.

For example, the device 100 may divide one year into four groups by season. For example, the device 100 may divide one year into four groups respectively including periods of 'November to February (winter)', 'March to May (spring)', 'June to August (summer)', and 'September and October (autumn)'. The device 100 may calculate the anticipated payment amount, which is anticipated to be paid by the user 20 at the card merchant 10 during a period corresponding to each group, based on the expenditure pattern information of the user 20. The device 100 may calculate the average payment amount averagely paid by the user 20 at card merchants having an identical or similar business category to that of the card merchant 10 during the period corresponding to each group, based on the identification information of the card used for the payment, the payment amount, the payment method (lump-sum payment or installment payment), the payment date, the payment time, and the card merchant name, which are included in the expenditure pattern information of the user 20. Based on the calculated average payment amount, the device 100 may determine the anticipated payment amount that is anticipated to be paid by the user 20 at the card merchant 10, for which the recommended card is to be used, during the period corresponding to each group.

In another example, the device 100 may divide one week into weekends (Saturday and Sunday) and weekdays (Monday to Friday) by day of the week and, based on the expenditure pattern information of the user 20, may calculate an average payment amount averagely paid by the user 20 during each of the weekends and the weekdays at card merchants having an identical or similar business category to that of the card merchant 10. Based on the calculated average payment amount, the device 100 may determine the anticipated payment amount that is anticipated to be paid by the user 20 for each day of the week at the card merchant 10, for which the recommended card is to be used.

In another example, the device 100 may divide one day into morning, afternoon, and evening by time zone and, based on the expenditure pattern information of the user 20, may calculate an average payment amount averagely paid by the user 20 during each of the morning, the afternoon, and the evening at card merchants having an identical or similar business category to that of the card merchant 10. Based on the calculated average payment amount, the device 100 may determine the anticipated payment amount that is anticipated to be paid by the user 20 for each time zone at the card merchant 10, for which the recommended card is to be used.

The device 100 may determine the anticipated payment amount that is anticipated to be paid by the user 20 at the card merchant 10, for which the recommended card is to be used, based on at least one of a current date, a day of the week, and a time, when the recommended card is provided.

According to the disclosed embodiments, the device 100 may determine the anticipated payment amount by considering at least one of a season, a time zone, and a day of the week, thereby determining the anticipated payment amount reflecting the expenditure pattern information of the user 20 better. In addition, the device 100 may provide the recommended card based on the determined anticipated payment amount, thereby more accurately providing a card that may provide a benefit of a greater discount amount to the user 20.

Figure 8:
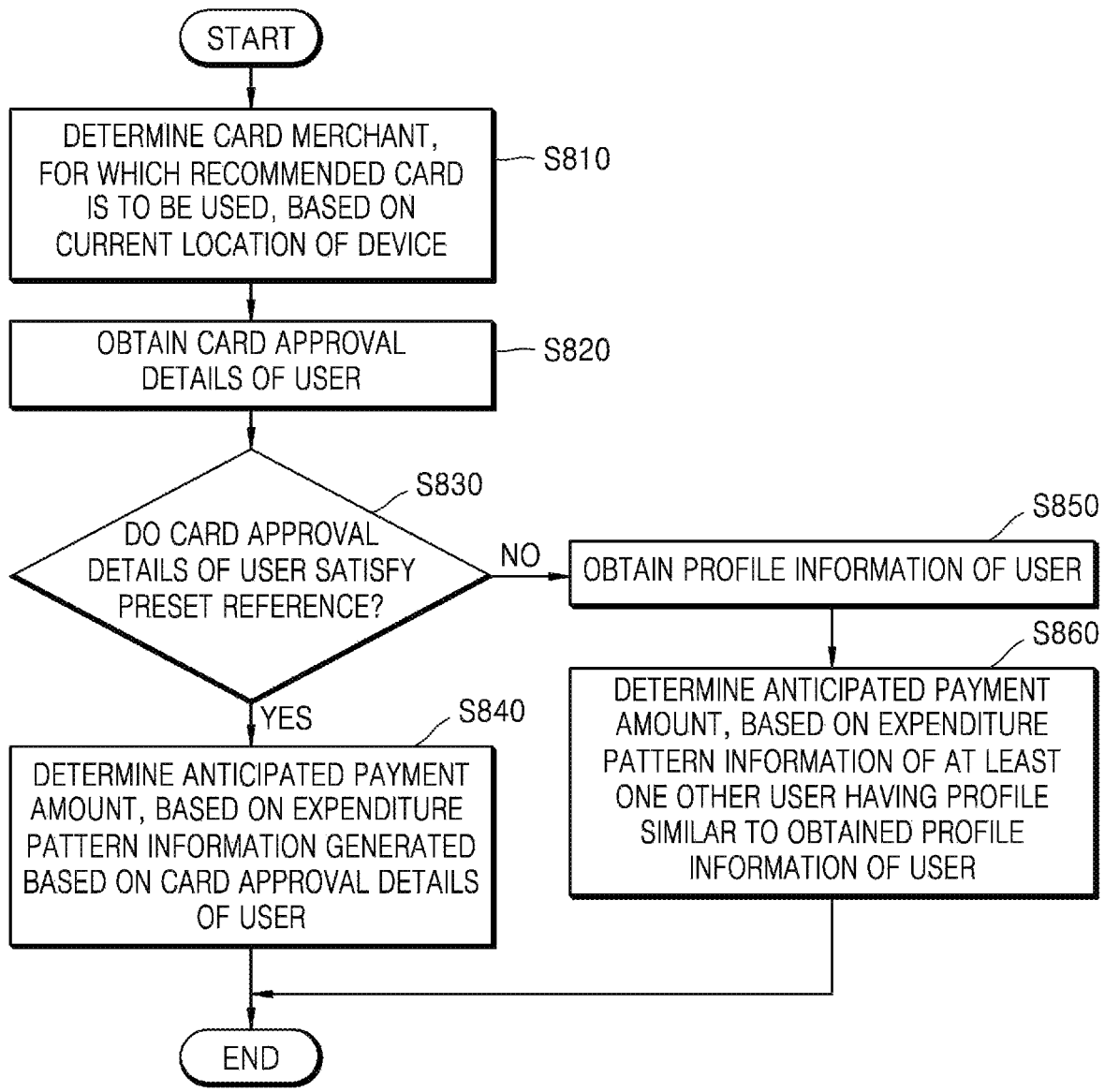
FIG. 8 is a flowchart illustrating a method, performed by the device 100, of determining an anticipated payment amount, according to an embodiment.

FIG. 8 is a flowchart illustrating a method, performed by the device 100, of determining an anticipated payment amount, according to an embodiment.

Referring to FIG. 8, in operation S810, the device 100 may determine the card merchant 10, for which a card recommended to the user 20 is to be used, based on the current location of the device 100. Operation S810 of FIG.

8 may correspond to operation S210 of FIG. 2, which has been described above. Thus, repeated descriptions will be omitted.

In operation S820, the device 100 may obtain card approval details of the user 20. For example, the device 100 may obtain the card approval details of the user 20 from a text message stored in the device 100. In another example, the device 100 may obtain the card approval details of the user 20, based on data of an application providing a household account book function, the data being stored in the device 100.

In operation S830, the device 100 may determine whether the obtained card approval details of the user 20 satisfy a preset reference. For example, the preset reference may include at least one of whether details of a payment made at a card merchant having an identical or similar business category to that of the card merchant 10, for which the card recommended to the user 20 is to be used, are included in the obtained card approval details a certain number of times or more, and whether a period of collecting the obtained card approval details is equal to or greater than a certain period. The expenditure pattern of the user 20 for a particular business category may vary with each season, each time zone, or each day of the week. Accordingly, when the card approval details of the user 20 are collected for a period of at least one year, more accurate expenditure pattern information for the user 20 may be generated. In addition, when the card approval details of the user 20 are collected for a period of at least one year, the device 100 may determine a more accurate anticipated payment amount based on the expenditure pattern information of the user 20, which is generated based on the card approval details. By determining whether the obtained card approval details of the user 20 satisfy the preset reference, the device 100 may determine whether the obtained card approval details of the user 20 include data sufficient to calculate the anticipated payment amount.

When the obtained card approval details of the user 20 satisfy the preset reference, in operation S840, the device 100 may determine the anticipated payment amount, based on the expenditure pattern information generated based on the card approval details of the user 20.

On the other hand, when the obtained card approval details of the user 20 do not satisfy the preset reference, in operation S850, the device 100 may obtain profile information of the user 20. Here, the profile information may include information indicating the gender, the age, the marital status, the income, the number of family members, or the automobile ownership or not of the user 20. However, the present disclosure is not limited thereto, and the profile information may include other factors that may make a meaningful change in the expenditure performed by the user 20.

In operation S860, the device 100 may obtain expenditure pattern information of at least one other user having a profile similar to the obtained profile information of the user 20. The device 100 may determine the anticipated payment amount, which is anticipated to be paid with the recommended card by the user 20 at the card merchant 10, based on the obtained expenditure pattern information of the at least one other user.

The device 100 may receive the expenditure pattern information of the at least one other user having a profile similar to the obtained profile information of the user 20, from an external server or a database. The device 100 may determine the anticipated payment amount, which is anticipated to be paid with the recommended card by the user 20 at the card merchant 10, based on the obtained expenditure pattern information of the at least one other user.

Figure 9:
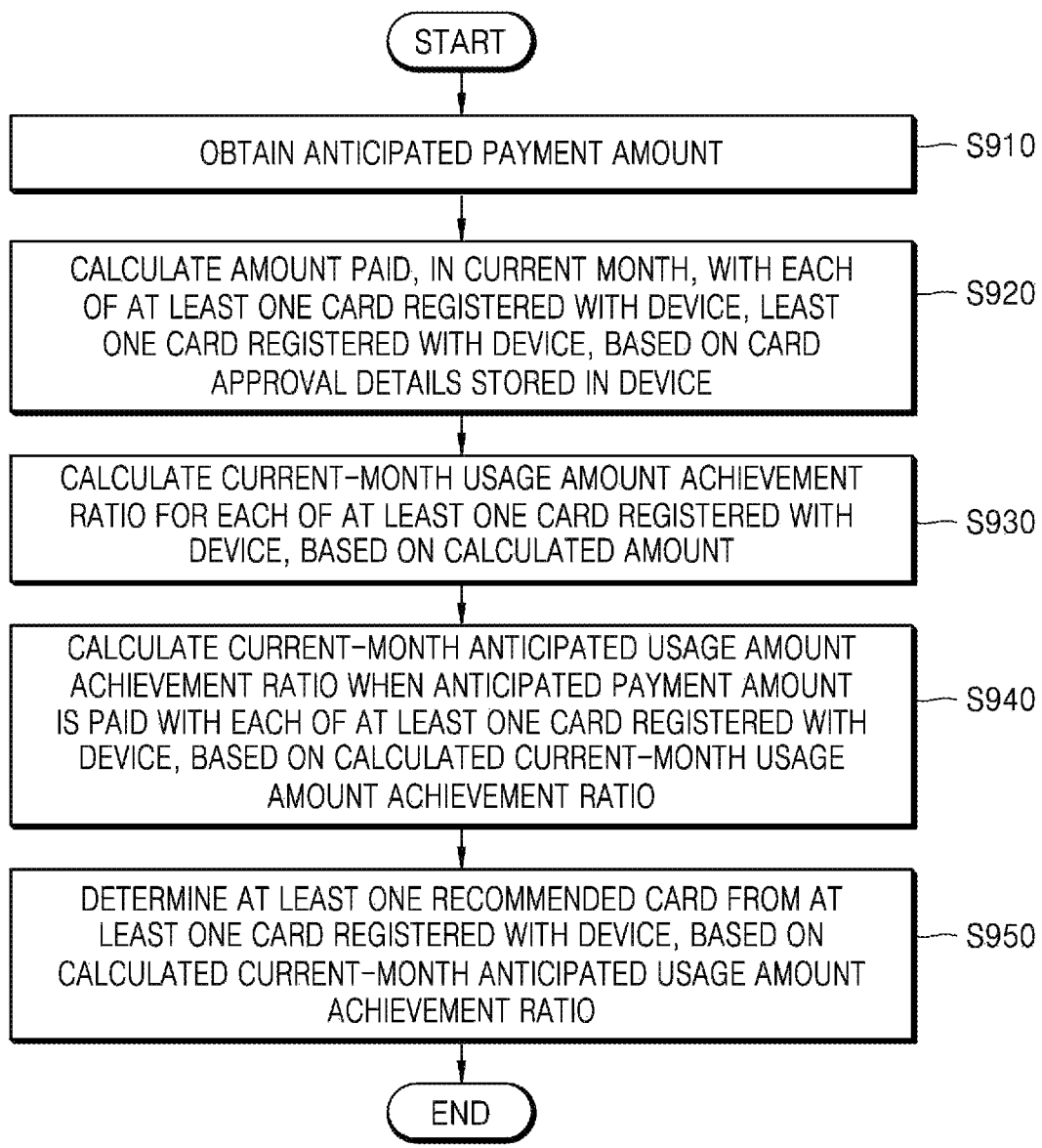
FIG. 9 is a flowchart of a method, performed by the device 100, of providing a recommended card by considering a current-month usage amount achievement ratio, according to an embodiment.

FIG. 9 is a flowchart of a method, performed by the device 100, of providing a recommended card by considering a current-month usage amount achievement ratio, according to an embodiment.

Referring to FIG. 9, according to an embodiment, a method, performed by the device 100, of determining the recommended card by further considering a next-month card benefit based on a current usage amount achievement ratio of each card registered with the device 100 and whether the current-month usage amount of each card registered with the device 100 achieves the reference is illustrated.

In operation S910, the device 100 determines an anticipated payment amount, which is anticipated to be paid with the recommended card by the user 20 at the card merchant 10.

A method, performed by the device 100, of determining the anticipated payment amount may correspond to at least one of the methods described above with reference to FIGS. 6 to 8. Thus, repeated descriptions will be omitted.

In operation S920, the device 100 may calculate an amount paid, in a current month, with each of the at least one card registered with the device 100, based on the card approval details stored in the device 100.

In operation S930, the device 100 may calculate a current-month usage amount achievement ratio of each of the at least one card registered with the device 100, based on the calculated amount.

In operation S940, based on the calculated current-month usage amount achievement ratio, the device 100 may calculate a current-month anticipated usage amount achievement ratio of each of the at least one card registered with the device 100 when the anticipated payment amount is paid with each of the at least one card registered with the device 100.

The device 100 may determine the current-month anticipated usage amount achievement ratio by further considering an average card usage amount of each of the at least one card, which is registered with the device 100, during the remaining period of the current month, in addition to considering the anticipated payment amount.

In operation S950, the device 100 may determine at least one recommended card from the at least one card registered with the device 100, based on the calculated current-month anticipated usage amount achievement ratio.

In the process of determining the recommended card, the device 100 may determine the recommended card by further considering the current-month anticipated usage amount achievement ratio of each of the at least one card registered with the device 100, in addition to considering the card benefit information of the at least one card registered with the device 100, the expenditure pattern information of the user 20, and the anticipated payment amount.

The device 100 may calculate an anticipated discount benefit amount, which may be received by the user 20, in the next month, from each of the at least one card registered with the device 100, based on the current-month anticipated usage amount achievement ratio of each of the at least one card registered with the device 100.

The device 100 may calculate the anticipated discount benefit amount, which may be received by the user 20, in the next month, from each of the at least one card registered with the device 100, based on the expenditure pattern information of the user 20, which includes metadata for the ranking information of the card merchant business category preferred by the user 20, the card usage frequency of the user 20 for each card merchant business category, or the like. The device 100 may finally determine, as the recommended card, a card allowed to provide a benefit of the greatest discount amount to the user 20, by considering the anticipated discount benefit amount, which may be received in the next month according to the card usage amount, in addition to considering the discount benefit amount, which may be currently received when making a payment with the at least one card registered with the device 100.

For example, when the user 20 makes a payment with the A card out of the at least one card, which is registered with the device 100, at the card merchant 10, for which the recommended card is to be currently used, the user 20 may receive a benefit of a discount amount of 500 KRW, and when making a payment with the B card, the user 20 may not receive a benefit of a discount. In addition, while the user 20 may satisfy the reference with the current-month usage amount of the A card, the user 20 may not satisfy the reference with the current-month usage amount of the B card. In this case, the device 100 may not simply determine, as the recommended card, the A card having a benefit of a discount amount of 500 KRW. That is, the device 100 may finally determine, as the recommended card, a card providing a benefit of a greater discount amount to the user 20 from between the A card and the B card, by considering whether the current-month usage amount of the B card may satisfy the reference when considering the remaining period of the current month and the anticipated payment amount at the card merchant 10, for which the recommended card is to be currently used, and also by considering an anticipated discount benefit amount that may be received from the B card in the next month when causing the usage amount of the B card to satisfy the reference.

Figure 10:
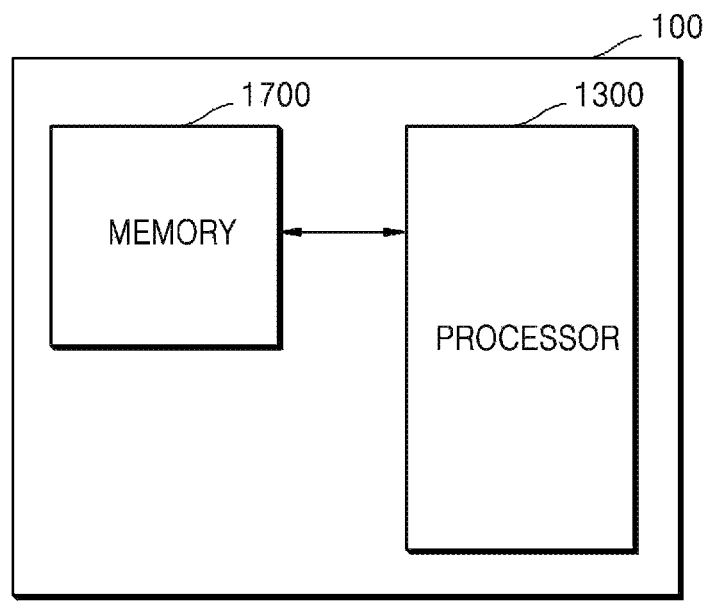
FIG. 10 is a block diagram of the device 100 according to an embodiment.

FIGS. 10 and 11 illustrate a block diagram of the device 100 according to an embodiment.

As shown in FIG. 10, the device 100 according to an embodiment may include a processor 1300 and memory 1700. However, not all the components shown in FIG. 10 are necessary components of the device 100. The device 100 may be implemented by more components than the components shown in FIG. 10, or the device 100 may be implemented by less components than the components shown in FIG. 10.

For example, as shown in FIG. 11, the device 100 according to some embodiments may further include a user input unit 1100, an output unit 1200, a sensing unit 1400, a communication module 1500, and an audio/video (A/V) input unit 1600, in addition to the processor 1300 and the memory 1700 shown in FIG. 10.

The user input unit 1100 refers to a means for a user to input data for controlling the device 100. For example, the user input unit 1100 may include, but is not limited to, a key pad, a dome switch, a touch pad (a touch capacitive type, a pressure resistive type, an infrared beam sensing type, a surface acoustic wave type, an integral strain gauge type, a piezoelectric type, or the like), a jog wheel, a jog switch, or the like.

The user input unit 1100 may receive, from the user 20, an input for registering a card, which is carried by the user 20, with the device 100. For example, the user input unit 1100 may receive, from the user 20, an input of at least one of a type, an expiration date, and a card number of the card carried by the user 20.

In addition, the user input unit 1100 may receive, from the user 20, an input of the anticipated payment amount to be paid with the recommended card by the user 20 at the card merchant 10.

In addition, the user input unit 1100 may receive, from the user 20, an input of the profile information of the user 20. The profile information may include information about the gender, the age, the number of family members, the income, the automobile ownership or not, or the marital status of the user 20.

The output unit 1200 may output an audio signal, a video signal, or a vibration signal, and the output unit 1200 may include the display unit 1210, the sound output unit 1220, and the vibration motor 1230.

The display unit 1210 displays information processed by the device 100. For example, during a process in which the device 100 provides the recommended card, the display unit 1210 may display a user interface for receiving required information from the user 20.

The display unit 1210 may display information used during the process of determining the recommended card. For example, the display unit 1210 may display the card merchant 10, for which the user 20 is to use the recommended card. In addition, the display unit 1210 may display the anticipated payment amount to be paid at the card merchant 10, for which the user 20 is to use the recommended card. Further, the display unit 1210 may display the discount benefit amount provided by each of the at least one card registered with the device 100.

The display unit 1210 may display the determined recommended card.

When the display unit 1210 and a touch pad form a layer structure and thus constitute a touch screen, the display unit 1210 may also be used as an input device in addition to being used as an output device. The display unit 1210 may include at least one of a liquid crystal display, a thin film transistor-liquid crystal display, an organic light-emitting diode display, a flexible display, a 3-dimensional (3D) display, and an electrophoretic display. In addition, the device 100 may include two or more display units 1210 according to an implementation type of the device 100. Here, the two or more display units 1210 may be arranged to face each other by using a hinge.

The sound output unit 1220 outputs audio data received from the communication module 1500 or stored in the memory 1700. In addition, the sound output unit 1220 outputs a sound signal related to a function (for example, a call signal receiving sound, a message receiving sound, or a notification sound) performed by the device 100. The sound output unit 1220 may include a speaker, a buzzer, or the like.

The vibration motor 1230 may output a vibration signal. For example, the vibration motor 1230 may output a vibration signal corresponding to an output of audio data or video data (for example, a call signal receiving sound, a message receiving sound, or the like). In addition, when a touch is input to a touch screen, the vibration motor 1230 may output a vibration signal.

The processor 1300 generally controls overall operations of the device 100. For example, the processor 1300 may take overall control of the user input unit 1100, the output unit 1200, the sensing unit 1400, the communication module 1500, the A/V input unit 1600, and the like by executing programs stored in the memory 1700. The processor may include at least one processor.

Specifically, the processor 1300 may recommend a card to the user 20 of the device 100 based on the location of the device 100, by performing at least one program stored in the memory 1700.

The processor 1300 determines the card merchant 10, for which the card recommended to the user 20 is to be used, based on the current location of the device 100.

In one embodiment, the processor 1300 may receive radio signals from access points around the device 100. The processor 1300 may select one from the access points around the device 100, based on strengths of the received radio signals.

The processor 1300 may determine a card merchant corresponding to the selected access point, as the card merchant 10, for which the card recommended to the user 20 is to be used. For example, the processor 1300 may obtain an identification value of the selected access point. In addition, the processor 1300 may determine a card merchant matching the obtained identification value, as the card merchant 10, for which the card recommended to the user 20 is to be used. Here, the card merchant matching the obtained identification value may be determined based on access point information received upon card approval and card merchant information within the card approval details.

The processor 1300 generates the expenditure pattern information of the user 20, based on the card approval details stored in the device 100. The expenditure pattern information of the user 20 may include metadata for at least one of the card usage amount information of each of the at least one card registered with the device 100, the card usage date, the card usage time, the ranking information of the card merchant business category preferred by the user 20, and the card usage frequency of the user 20 for each card merchant business category.

The processor 1300 determines at least one recommended card from the at least one card registered with the device 100, based on the determined card merchant, the card benefit information of the at least one card registered with the device 100, and the expenditure pattern information of the user 20.

In one embodiment, the processor 1300 may determine the anticipated payment amount to be paid by the user 20 at the card merchant 10, for which the card recommended to the user 20 is to be used. For example, the processor 1300 may determine the anticipated payment amount, based on a voice signal received from the microphone 1620. In addition, the processor 1300 may determine the anticipated payment amount, based on the card merchant 10 and the expenditure pattern information of the user 20. Further, the processor 1300 may determine the anticipated payment amount, based on expenditure pattern information of at least one other user, the expenditure pattern information being received from at least one of an external server and a database. Here, the at least one other user may be a user having a profile similar to the profile information of the user 20. In addition, the processor 1300 may receive an input of the anticipated payment amount from the user 20 through the user input unit 1100.

The processor 1300 may calculate a discount benefit amount provided to the user 20 as the anticipated payment amount is paid with each of the at least one card registered with the device 100. The processor 1300 may determine at least one recommended card from the at least one card registered with the device 100, based on the calculated discount benefit amount.

In one embodiment, the processor 1300 may calculate the current-month usage amount achievement ratio of each of the at least one card registered with the device 100, based on the card approval details of the user 20, which are stored in the device 100. The processor 1300 may calculate the current-month anticipated usage amount achievement ratio when the anticipated payment amount is paid with each of the at least one card registered with the device 100, based on the calculated current-month usage amount achievement ratio. The processor 1300 may determine at least one recommended card from the at least one card registered with the device 100, based on the calculated current-month anticipated usage amount achievement ratio.

The processor 1300 provides the determined at least one recommended card. The processor 1300 may control the display unit 1210 to display the determined at least one recommended card. In addition, the processor 1300 may control the communication module 1500 to transmit information about the determined at least one recommended card to an external device (for example, a POS system of the card merchant 10).

The sensing unit 1400 may sense a state of the device 100 or a state around the device 100 and may transfer sensed information to the processor 1300.

The sensing unit 1400 may include, but is not limited to, at least one of a geomagnetic sensor 1410, an acceleration sensor 1420, a temperature/humidity sensor 1430, an infrared sensor 1440, a gyroscope sensor 1450, a position sensor (for example, a GPS) 1460, a barometric pressure sensor 1470, a proximity sensor 1480, and an RGB sensor (illuminance sensor) 1490. Because a function of each sensor may be intuitively inferred from the name thereof by one of ordinary skill in the art, descriptions thereof will be omitted.

The communication module 1500 may include at least one component allowing communication with at least one of an external server, an external device, and a database. For example, the communication module 1500 may include a short-range wireless communication unit 1510, a mobile communication unit 1520, and a broadcast receiver 1530.

The short-range wireless communication unit 1510 may include, but is not limited to, a Bluetooth communication unit, a Bluetooth Low Energy (BLE) communication unit, a near field communication unit, a wireless local area network (WLAN) (Wi-Fi) communication unit, a Zigbee communication unit, an Infrared Data Association (IrDA) communication unit, a Wi-Fi Direct (WFD) communication unit, an ultra wideband (UWB) communication unit, an Ant+ communication unit, or the like.

The mobile communication unit 1520 transmits a radio signal to and receives a radio signal from at least one of a base station, an external terminal, and a server on a mobile communication network. Here, the radio signal may include various types of data according to transmission and reception of a voice call signal, a video call signal, or a text/multimedia message.

The broadcast receiver 1530 receives a broadcast signal and/or broadcast-related information from outside thereof through a broadcast channel. The broadcast channel may include a satellite channel or a terrestrial channel. The device 100 may not include the broadcast receiver 1530, according to an implementation example.

In addition, the communication module 1500 may transmit the card approval details of the user 20 to at least one of an external server and a database, the card approval details being stored in the device 100. Further, the communication module 1500 may transmit the expenditure pattern information of the user 20 to at least one of an external server and a database, the expenditure pattern information being generated by the device 100.

In addition, the communication module 1500 may receive expenditure pattern information of at least one other user having a profile similar to the profile information of the user 20, from at least one of an external server and a database.

Further, the communication module 1500 may transmit information about the determined recommended card to an external device (for example, a POS system).

The A/V input unit 1600 is for inputting an audio signal or a video signal and may include a camera 1610, the microphone 1620, and the like. The camera 1610 may obtain an image frame of a still image, a moving image, or the like through an image sensor in a video call mode or a shooting mode. An image captured through the image sensor may be processed by the processor 1300 or a separate image processing unit (not shown).

The image frame processed by the camera 1610 may be stored in the memory 1700 or may be transmitted to the outside of the device 100 through the communication module 1500. Two or more cameras 1610 may be provided according to a configuration of a terminal.

The microphone 1620 receives an external sound signal that is input thereto and processes the sound signal into electrical sound data. For example, the microphone 1620 may receive a sound signal from an external device or a speaker. The microphone 1620 may use various noise cancelling algorithms for removing noise generated during the reception of the external sound signal.

In addition, the microphone 1620 may receive voice signals from the user 20 and a cashier (600 of FIG. 6) of the card merchant 10.

The memory 1700 may store programs and instructions for processing and control performed by the processor 1300, and may store data that is input from the device 100 or output from the device 100.

The memory 1700 may include at least one of a flash memory type storage medium, a hard disk type storage medium, a multimedia card micro type storage medium, card type memory (for example, Secure Digital (SD) memory, eXtreme Digital (XD) memory, or the like), random access memory (RAM), static random access memory (SRAM), read-only memory (ROM), electrically erasable programmable read-only memory (EEPROM), programmable read-only memory (PROM), magnetic memory, a magnetic disk, and an optical disk.

The programs stored in the memory 1700 may be classified into a plurality of modules, for example, a user interface (UI) module 1710, a touch screen module 1720, a notification module 1730, and the like, according to functions thereof.

The UI module 1710 may provide a specialized UI, a graphics user interface (GUI), or the like interworking with the device 100, on an application basis. The touch screen module 1720 may sense a touch gesture of a user on a touch screen and may transfer information about the touch gesture to the processor 1300. The touch screen module 1720 according to some embodiments may recognize and analyze a touch code. The touch screen module 1720 may be configured by separate hardware including a controller.

To sense a touch or a proximity touch with respect to the touch screen, various sensors may be arranged inside or near the touch screen. An example of a sensor for sensing a touch with respect to the touch screen includes a tactile sensor. The tactile sensor refers to a sensor sensing a contact with a particular object to an extent felt by a human or to a higher extent. The tactile sensor may sense various pieces of information, such as roughness of a contact surface, hardness of a contact object, and a temperature of a contact point.

In addition, an example of a sensor for sensing a touch with respect to the touch screen includes a proximity sensor.

The proximity sensor refers to a sensor detecting an object approaching a certain detection surface or the presence or not of an object in the vicinity thereof, without mechanical contact, by using force of an electromagnetic field or using an infrared ray. Examples of the proximity sensor include a transmission type photoelectric sensor, a direct reflection type photoelectric sensor, a mirror reflection type photoelectric sensor, a high-frequency oscillation type proximity sensor, a capacitive proximity sensor, a magnetic proximity sensor, an infrared proximity sensor, and the like. The touch gesture of the user may include tap, touch and hold, double tap, drag, panning, flick, drag and drop, swipe, or the like.

The notification module 1730 may generate a signal for notifying the occurrence of an event of the device 100. Examples of the event occurring in the device 100 include call signal reception, message reception, a key signal input, schedule notification, and the like. The notification module 1730 may output a notification signal in the form of a video signal through the display unit 1210, may output a notification signal in the form of an audio signal through the sound output unit 1220, or may output a notification signal in the form of a vibration signal through the vibration motor 1230.

The embodiments described above may be written in a program executable on a computer and may be implemented by a general-purpose digital computer executing the program by using a computer-readable medium. In addition, a structure of data used in the embodiments described above may be recorded on a computer-readable medium by various means. Further, the embodiments described above may be implemented in the form of a recording medium including instructions executable by a computer, such as a program module executed by the computer. For example, methods implemented by software modules or algorithms may be stored as code or program instructions, which are readable and executable by a computer, in computer-readable recording media.

The computer-readable medium may be any recording medium accessible by a computer and may include volatile and non-volatile media and separable and non-separable media. The computer-readable medium may include, but is not limited to, storage media, such as magnetic recording media, for example, ROM, a floppy disk, a hard disk, and the like, and optical reading media, for example, CD-ROM, a digital versatile disk (DVD), and the like. In addition, the computer-readable medium may include a computer storage medium and a communication medium.

Further, a plurality of recording media readable by a computer may be distributed in computer systems connected by a network, and data stored in the distributed recording media, for example, program instructions and code, may be executed by at least one computer.

What is claimed is:

1. A device comprising:
   a memory, in which at least one program is stored; and
   at least one processor configured to execute the at least one program to recommend a card to a user of the device based on a location of the device,
   wherein the memory comprises instructions enabling, when the device is operated, the at least one processor to perform:
   receiving radio signals among a plurality of access points around the device;
   selecting at least one access point from the plurality of access points, based on a strength of the received radio signals;
   determining a card merchant corresponding to the selected at least one access point;
   generating expenditure pattern information of the user of the registered at least one card, based on data extracted from card approval details;

determining at least one recommended card regarding the determined card merchant from at least one card registered with the device, based on the card merchant and card benefit information of the registered at least one card and the expenditure pattern information;

providing the at least one recommended card; and wherein the determining of the card merchant corresponding to the selected at least one access point comprises:

obtaining an identification value of the selected at least one access point; and determining, as the card merchant, a card merchant matching the obtained identification value, and the card merchant matching the obtained identification value is determined based on access point information of a radio signal received upon card approval and card merchant information within the card approval details.

2. The device of claim 1, wherein the expenditure pattern information of the user comprises metadata for at least one of card usage amount information of each of the registered at least one card, a card usage date, a card usage time, ranking information of a card merchant business category preferred by the user, or a card usage frequency of the user for each card merchant business category.

3. The device of claim 1, wherein the determining of the at least one recommended card comprises:

determining an anticipated payment amount to be paid by the user at the determined card merchant;

calculating a discount benefit amount provided to the user as the determined anticipated payment amount is paid with each of the registered at least one card; and determining the at least one recommended card from the registered at least one card, based on the discount benefit amount.

4. The device of claim 3, wherein the determining of the anticipated payment amount comprises:

calculating an average payment amount paid by the user at at least one card merchant having the same business category as that of the determined card merchant, based on expenditure pattern information of the user; and estimating the anticipated payment amount to be paid by the user at the determined card merchant, based on the calculated average payment amount.

5. The device of claim 3, wherein the determining of the anticipated payment amount comprises:

obtaining profile information of the user; and estimating the anticipated payment amount, based on expenditure pattern information of at least one other user having a profile similar to the profile information of the user.

6. The device of claim 3, wherein the determining of the at least one recommended card comprises:

calculating an amount paid in a current month by each of the registered at least one card, based on card approval details stored in the device;

calculating a current-month usage amount achievement ratio of each of the registered at least one card, based on the calculated amount;

calculating a current-month anticipated usage amount achievement ratio when the anticipated payment amount is paid with each of the registered at least one card, based on the calculated current-month usage amount achievement ratio; and determining the at least one recommended card from the registered at least one card, based on the calculated current-month anticipated usage amount achievement ratio.

7. A method of providing a recommended card, the method comprising:

receiving radio signals among a plurality of access points around the device;

selecting at least one access point from the plurality of access points, based on a strength of the received radio signals;

determining a card merchant corresponding to the selected at least one access point;

generating expenditure pattern information of the user of the registered at least one card, based on data extracted from card approval details;

determining at least one recommended card regarding the determined card merchant from at least one card registered with the device, based on the card merchant and card benefit information of the registered at least one card and the expenditure pattern information;

providing the at least one recommended card; and wherein the determining of the card merchant corresponding to the selected at least one access point comprises:

obtaining an identification value of the selected at least one access point; and determining, as the card merchant, a card merchant matching the obtained identification value, and the card merchant matching the obtained identification value is determined based on access point information of a radio signal received upon card approval and card merchant information within the card approval details.

8. The method of claim 7, wherein the determining of the at least one recommended card comprises:

determining an anticipated payment amount to be paid by the user at the determined card merchant;

calculating a discount benefit amount provided to the user as the determined anticipated payment amount is paid with each of the registered at least one card; and determining the at least one recommended card from the registered at least one card, based on the discount benefit amount.

9. The method of claim 8, wherein the determining of the anticipated payment amount comprises:

calculating an average payment amount paid by the user at at least one card merchant having the same business category as that of the determined card merchant, based on expenditure pattern information of the user; and estimating the anticipated payment amount to be paid by the user at the determined card merchant, based on the calculated average payment amount.

10. The method of claim 8, wherein the determining of the anticipated payment amount comprises:

obtaining profile information of the user; and estimating the anticipated payment amount, based on expenditure pattern information of at least one other user having a profile similar to the profile information of the user.

11. A computer program product comprising a computer-readable storage medium, the computer-readable storage medium comprising instructions for performing:

receiving radio signals among a plurality of access points around the device;

selecting at least one access point from the plurality of access points, based on a strength of the received radio signals;

determining a card merchant corresponding to the selected access point;

generating expenditure pattern information of the user of the registered at least one card, based on data extracted from card approval details;

determining at least one recommended card regarding the determined card merchant from at least one card registered with the device, based on the card merchant and card benefit information of the registered at least one card and the expenditure pattern information;
providing the at least one recommended card; and
wherein the determining of the card merchant corresponding to the selected at least one access point comprises:
obtaining an identification value of the selected at least one access point; and
determining, as the card merchant, a card merchant matching the obtained identification value, and
the card merchant matching the obtained identification value is determined based on access point information of a radio signal received upon card approval and card merchant information within the card approval details.

* * * * *